United States Patent
Wu et al.

(10) Patent No.: US 6,904,506 B2
(45) Date of Patent: Jun. 7, 2005

(54) METHOD AND MOTHERBOARD FOR AUTOMATICALLY DETERMINING MEMORY TYPE

(75) Inventors: Chung-Che Wu, Taipei (TW); Chung-Ching Huang, Taipei Hsien (TW); Chien-Ping Chung, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 410 days.

(21) Appl. No.: 09/874,163

(22) Filed: Jun. 5, 2001

(65) Prior Publication Data

US 2002/0144074 A1 Oct. 3, 2002

(30) Foreign Application Priority Data

Mar. 28, 2001 (TW) ........................................ 90107335 A

(51) Int. Cl.⁷ .............................................. G06F 13/00
(52) U.S. Cl. ...................... 711/170; 711/154; 711/104; 711/105; 713/300; 713/320; 365/226; 365/227
(58) Field of Search ................................. 711/170, 105, 711/154, 104; 713/320, 321, 330, 340, 300; 365/226, 227, 225, 63; 710/302, 104

(56) References Cited

U.S. PATENT DOCUMENTS

| 5,828,892 | A | * | 10/1998 | Mizuta | ........................ 713/300 |
| 6,308,278 | B1 | * | 10/2001 | Khouli et al. | ................ 713/323 |
| 6,498,759 | B2 | * | 12/2002 | Chang et al. | ................ 365/226 |
| 6,505,282 | B1 | * | 1/2003 | Langendorf et al. | ......... 711/170 |
| 6,516,381 | B1 | * | 2/2003 | Hamilton et al. | ............ 711/105 |
| 6,563,339 | B2 | * | 5/2003 | Pekny et al. | .................... 326/33 |
| 6,567,904 | B1 | * | 5/2003 | Khandekar et al. | .......... 711/170 |
| 6,751,740 | B1 | * | 6/2004 | Robertson et al. | ........... 713/300 |
| 6,769,069 | B1 | * | 7/2004 | Nguyen | ....................... 713/300 |
| 2001/0001146 | A1 | * | 5/2001 | Petersen | ....................... 705/26 |
| 2002/0003740 | A1 | * | 1/2002 | Chang et al. | ................ 365/226 |
| 2002/0067368 | A1 | * | 6/2002 | Colligan et al. | ............. 345/716 |
| 2003/0084233 | A1 | * | 5/2003 | Williams | ...................... 711/105 |

* cited by examiner

*Primary Examiner*—Hong Kim
(74) *Attorney, Agent, or Firm*—J.C. Patents

(57) ABSTRACT

A method and a motherboard for automatically determining the memory type. By applying the characteristics of different operational voltages for various dynamic random access memory modules, a software program is used to drive a control signal and to automatically adjust the control voltage of the dynamic random access memory. An automatic detection of the types of the dynamic random access memory is obtained. The objectives of protecting the dynamic random access memory and to allow the dynamic random access memory to operate normally can thus be achieved. The invention not only provides the detection mechanism for accessing the dynamic random access memory during the initial activation of the computer system, but also determines the voltages required by the memory module for the computer system to enter various power saving modes.

10 Claims, 3 Drawing Sheets

METHOD AND MOTHERBOARD FOR AUTOMATICALLY DETERMINING MEMORY TYPE

CROSS REFERENCE TO RELATED APPLICATION

This application claims the priority benefit of Taiwan application serial no. 90107335, filed on Mar. 28, 2001.

BACKGROUND OF THE INVENTION

1. Field of the Invention

The invention relates in general to a technique for determining the memory type, and more particularly, the invention relates to an automatic determining mechanism of a motherboard that support various types of memories.

2. Description of the Related Art

Dynamic random access memory (DRAM) plays an important role in the field of personal computers. As techniques develop and cost is reduced, the types and capacity of the dynamic random access memory continuously progress. The most popular dynamic random access memory on the market includes the synchronous dynamic random access memory (SDRAM). Inevitably, the SDRAM is replaced as technique progresses. Currently, the double data rate dynamic random access memory (DDR DRAM) is the representative product of the next generation. However, as the technique is not fully developed yet, it is still too expensive. Therefore, in the transition time of two generations, a motherboard that accommodates both the SDRAM and the DDR DRAM is produced in personal computer industry. The operation voltage such as I/O supply voltage for the DDR DRAM is 2.5V, while the operation voltage for the SDRAM is 3.3V. The mixed DRAM motherboard provides the jumper to let the user to configure the type of DRAM. However, this confuses the user and easily causes manmade mistake in operation, consequently damaging the equipment. Therefore, a mechanism to automatically determine the type of DRAM is necessary.

Currently, most computer systems provide several power saving modes like suspend to RAM (STR) mode or suspend to disk (STD) mode. No matter the computer system is reset or rebooted after soft off, mechanical off, or STD mode, the mixed DRAM motherboard must have a mechanism to redetect the type of DRAM. When the computer system enters the STR mode, the motherboard has to maintain a configured operation voltage to prevent memory from data loss or from damage.

SUMMARY OF THE INVENTION

The invention provides a method and a motherboard for automatically determining the type of memory. By applying the characteristic of having different operation voltage for different DRAM modules, a software program is used to test the DRAM modules and generate a control signal to automatically adjust the DRAM control voltage, so as to achieve the automation determination of the type of DRAM. Therefore, the DRAM module is protected and operated normally.

The present invention provides a method of automatically determining a type of a memory applied in a computer system, comprises the steps of outputting a preset voltage to the memory; performing an operation on the memory; determining a type of the memory; outputting a control signal; outputting a voltage adjustment signal according to the control signal and the system power state signal; and outputting a configured operation voltage to the memory according to the voltage adjustment signal.

The present invention further provides a motherboard to automatically determine a type of a memory, comprises a hardware device, at least one memory module slot, a voltage control circuit, and a recognition apparatus. The hardware device generates a control signal. The memory module slot accommodates a memory. The voltage control circuit couples to the memory module slot to provide a configured operation voltage to the memory module slot. The recognition apparatus couples to the system power state signal, the control signal and the voltage control circuit. In this way, the voltage control circuit firstly outputs a preset voltage to the memory and then the hardware device outputs the control signal after performing an operation to determine a type of the memory, and then the recognition apparatus outputs a voltage adjustment signal after receiving the control signal and the system power state signal, so that the voltage control circuit outputs the configured operation voltage to the memory.

Both the foregoing general description and the following detailed description are exemplary and explanatory only and are not restrictive of the invention, as claimed.

DESCRIPTION OF THE PREFERRED EMBODIMENTS

Figure 1:
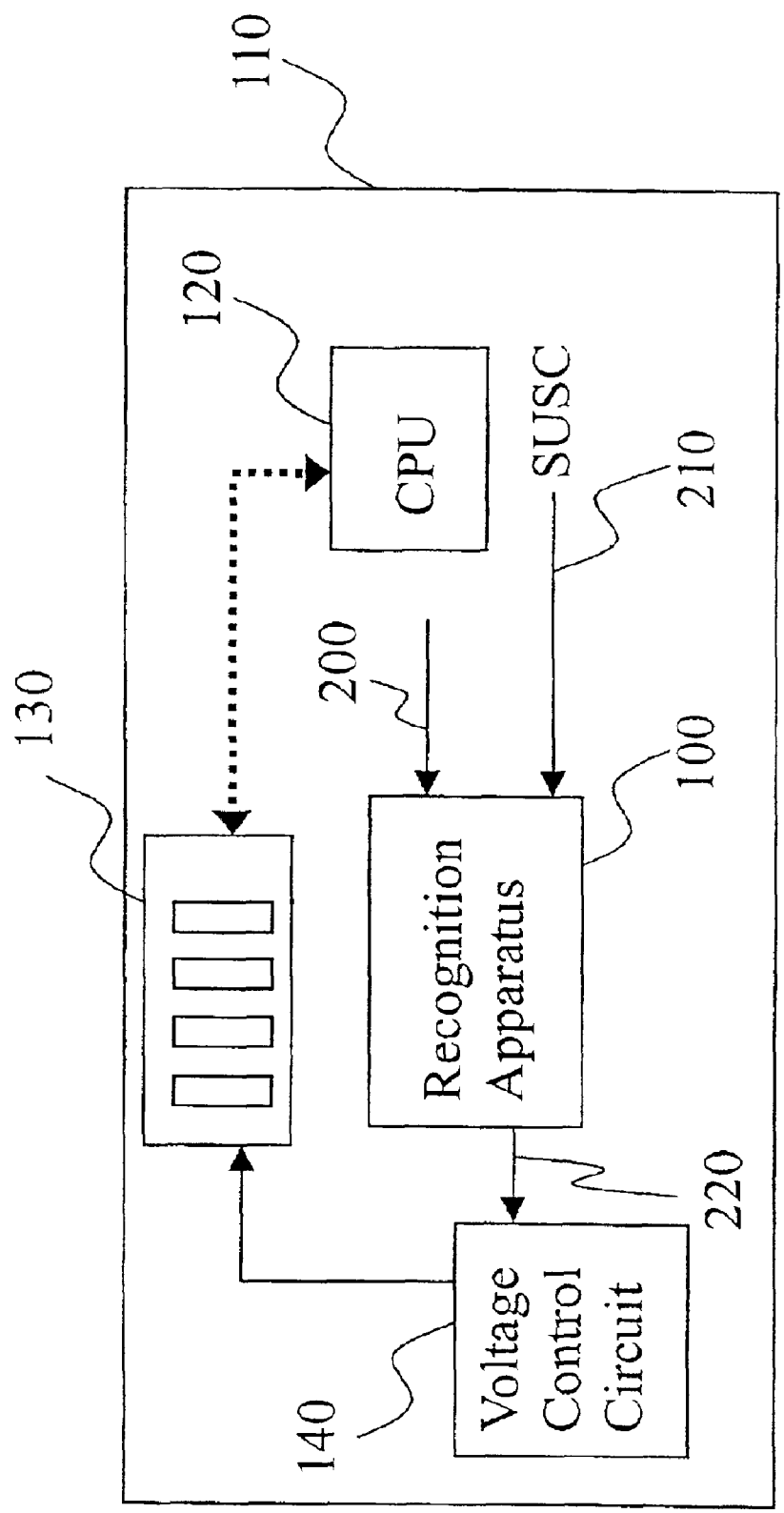
FIG. 1 shows an embodiment of a computer system according to the invention.

FIG. 1 shows an embodiment of a computer system according to the invention. In FIG. 1, a motherboard 110 comprises a system power state signal (SUSC) 210, a voltage control circuit 140, a processor (central processing unit, CPU) 120, and a recognition apparatus 100. The processor 120 executes a software program to generate a control signal 200 to the recognition apparatus 100. Obviously, the processor executing the software program is only one embodiment of the invention. Any hardware device working like a processor executing the same software program and generating the control signal 200 can be utilized in the present invention. The present invention does not limit the device generating the control signal 200.

After decoding the control signal 200 and the system power state signal (SUSC) 210, the recognition apparatus 100 of the motherboard 110 outputs a voltage adjustment signal 220 to the voltage control circuit 140. The function of the software program is to determine the used type of the DRAM by accessing the memory in the memory module slot 130. The recognition apparatus 100 then determines what the current system state is, generates the proper voltage adjustment signal 220 and sends the voltage adjustment signal to the voltage control circuit 140. The system power state can be obtained from the system power state signal (SUSC) 210. If the system power state signal (SUSC) is a low logic state, the system is in a STD, a soft off mode, or mechanical off mode. The motherboard 110 then only provides a low configured operation voltage (such as 2.5V I/O supply voltage). When the system power state signal (SUSC) is a high logic state, the memory inserted in the memory module slot 130 requires a configured operation voltage. The motherboard must provide the SDRAM with a configured operation voltage of 3.3V, or provide the DDR DRAM with a configured operation voltage of 2.5V according to the detected type of DRAM.

Figure 2:
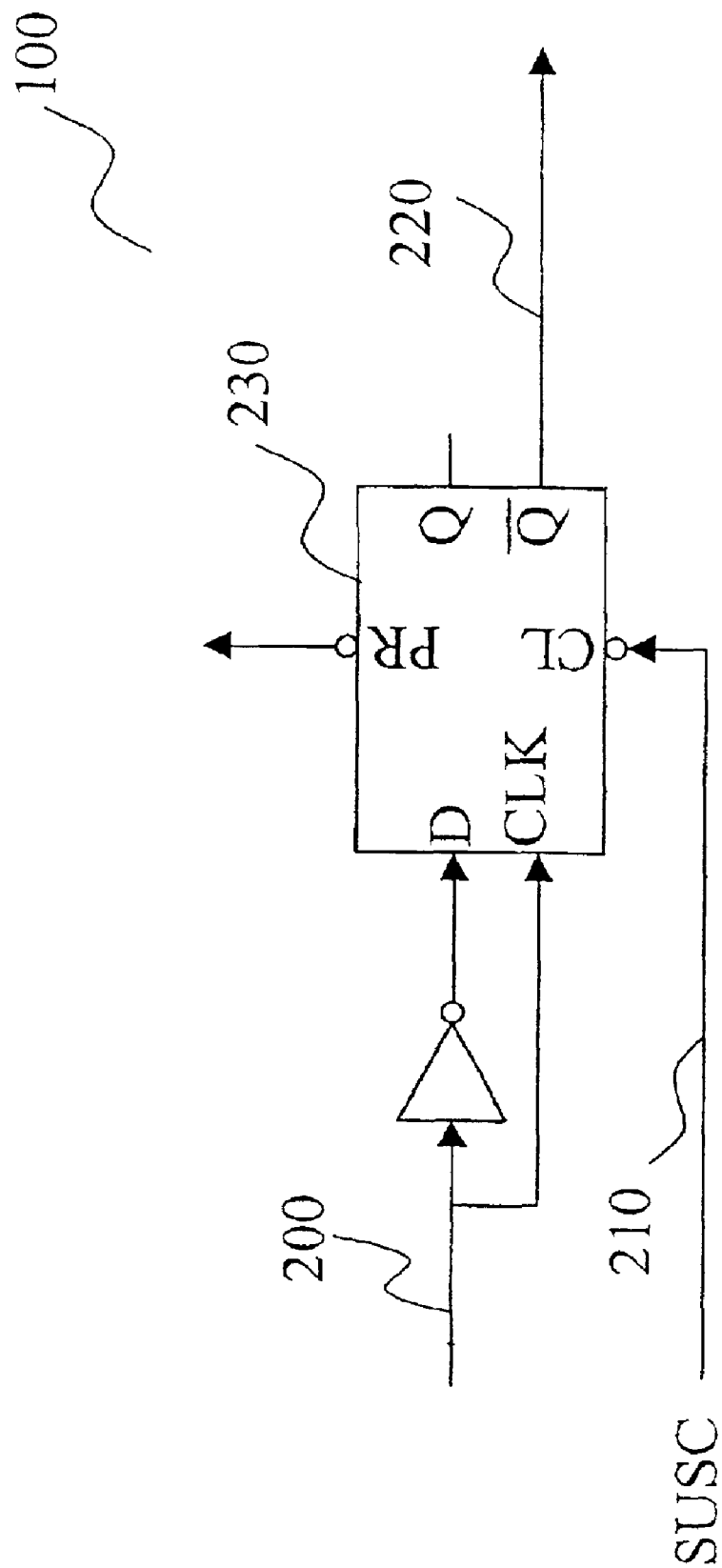
FIG. 2 shows the internal circuit of a recognition apparatus.

FIG. 2 shows the internal circuit of a recognition apparatus 100 according to the invention. Referring to both FIGS. 1 and 2, the recognition apparatus 100 comprises a D-flip-flop such as an RS D-flip-flop 230. The RS D-flip-flop 230 receives a control signal 200 and a system power state signal (SUSC) 210 to generate a voltage adjustment signal 220 to the voltage control circuit 140 of the motherboard 110. The inverter has the input terminal coupled to the control signal 200 and an output terminal coupled to a D (data) terminal of an RS D-flip-flop 230. The control signal 200 is further coupled to a CLK (clock) terminal of the RS D-flip-flop 230. When the system power state signal (SUSC) 210 is the low logic state, since the system power state signal (SUSC) 210 is coupled to an CL (clear) terminal of the RS D-flip-flop 230, the output terminal #Q (that is, the voltage adjustment signal 220) is configured as a high logic state.

The operation indicates that the system state is STD mode, soft off mode, or mechanical off mode. The voltage control circuit 140 only has to output a configured operation voltage of 2.5V to the memory in the memory module slot 130. When the system power state signal (SUSC) is a high logic state, the memory in the memory module slot 130 requires a configured operation voltage to provide the SDRAM or the DDR DRAM to normal active. If the control signal 200 is converted from the low logic state to the high logic state, the CLK terminal of the RS D-flip-flop 230 is triggered to send the delayed control signal 200 to the RS D-flip-flop 230. As a result, the voltage adjustment signal 220 coupled to the output terminal #Q is configured as a low logic state. The operation indicates that the type of DRAM in use is SDRAM and causes the voltage control circuit to output the configured operation voltage of 3.3V to the memory. In addition to the above description, the output terminal #Q of the RS D-flip-flop 230 is remains at the previous logic state, so that the voltage control circuit keeps providing the same configured operation voltage. To correctly operate in the STR mode, STD mode, soft off mode, or mechanical off mode the recognition apparatus may uses a standby power source. The PR (preset) terminal of the RS D-flip-flop 230 is coupled to a specific voltage source to avoid affecting operation.

Figure 3:
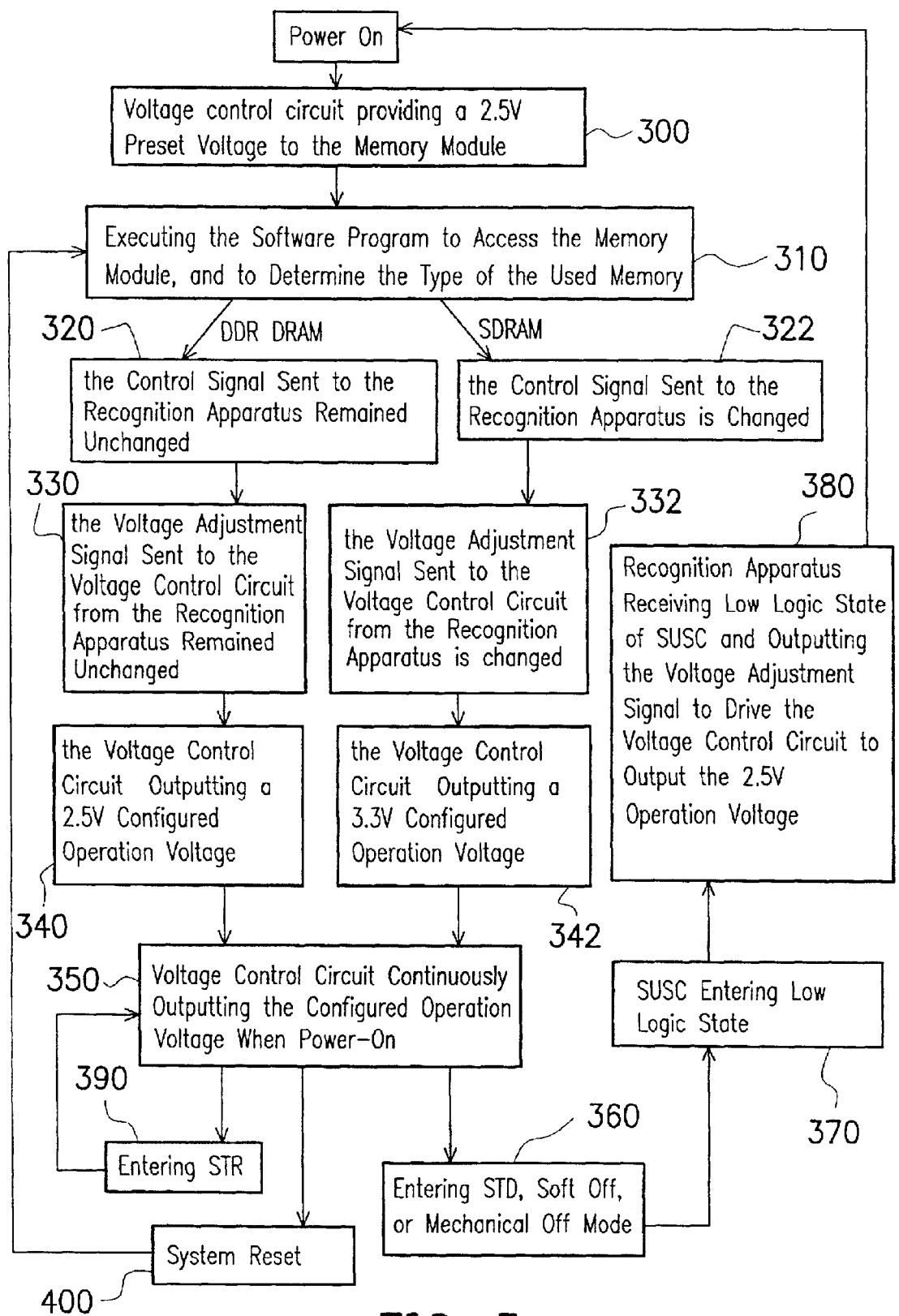
FIG. 3 is a flow chart showing the method provided by the invention.

FIG. 3 is a flow chart of a method for automatically determining the type of memory provided by the invention. When the computer system is power on (or the computer is rebooted from the STD, soft off, or mechanical off mode), the voltage control circuit firstly outputs 2.5V to the memory module in step 300. The computer system executes a software program to perform an accessing operation on the memory, and to determine whether the current memory module is functioning normally in step 310. If the type of DRAM in use is DDR DRAM, the control signal sent remains unchanged in step 320, and the voltage adjustment signal sent to the voltage control circuit is also unchanged in step 330. The voltage control circuit does not change the configured operation voltage of 2.5V after receiving the voltage adjustment signal in step 340. In the power on procedure, the voltage control circuit keeps outputting the configured operation voltage (2.5V) in step 350. In contrast, if the currently used type of memory is SDRAM, the control signal sent to the recognition apparatus is changed in step 322. The voltage adjustment signal sent from the recognition apparatus to the voltage control circuit is changed in step 332. In step 342, the voltage control circuit outputs a configured operation voltage of 3.3V. During the power on procedure, the voltage control circuit keeps outputting the configured operation voltage (3.3V) in step 350. When the computer system enters the STD mode, soft off mode, or mechanical off mode in step 360, the system power state signal SUSC enters the low logic state in step 370. A recognition apparatus is provided to receive the system power state signal (SUSC) to determine whether the system is in the STD mode, soft off mode or mechanical mode. If the system is in these modes, the recognition apparatus ignores the result of the control signal and directly drives the voltage control circuit to provide the memory module with 2.5V in step 380. In the STR mode, an operation is performed with a previous voltage adjustment signal without changing to prevent memory from data loss or from damage in step 390. In addition, if the system is reset in step 400, the process goes back to step 310, and the computer system executes the software program to determine the type of the used memory module.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A method of automatically determining a type of a memory applied in a computer system, wherein the computer system comprises a system power state signal, a voltage control circuit and at least one memory module slot to accommodate a memory, the method comprising:

outputting a preset voltage to the memory;

performing an operation on the memory by executing a computer implemented set of instructions;

determining a type of the memory based on the result of the executed computer implemented set of instructions;

outputting a control signal based on the determined type of the memory;

outputting a voltage adjustment signal according to the control signal and the system power state signal;

outputting a configured operation voltage to the memory according to the voltage adjustment signal; and having the system power state signal entering a low logic state when the computer system enters a STD mode, a soft off mode or a mechanical power off mode; and having the recognition apparatus receiving the system power state signal driving the voltage control circuit to output the preset voltage to the memory.

2. The method according to claim 1, wherein a processor executes a software program to perform the operation on the memory, to determine the type of the memory, and to output the control signal.

3. The method according to claim 2, further comprising performing the operation on the memory with the software program, which software program then determines the type of the memoir, when the computer system enters a reset state.

4. The method according to claim 1, wherein a hardware device performs the operation on the memory, determines the type of the memory, and outputs the control signal.

5. A method of automatically determining a type of a memory applied in a computer system, wherein the computer system comprises a system power state signal, a voltage control circuit and at least one memory module slot to accommodate a memory, the method comprising:

outputting a preset voltage to the memory;
performing an operation on the memory;
determining a type of the memory;
outputting a control signal;
outputting a voltage adjustment signal according to the control signal and the system power state signal;
outputting a configured operation voltage to the memory according to the voltage adjustment signal; and
operating the voltage control circuit according to a previous voltage adjustment signal without changing a previously provided configured operation voltage when the computer system enters a STR mode.

6. A motherboard to automatically determine a type of a memory, used in a computer system that has a system power state signal, the motherboard comprising:
   a hardware vice, generating a control signal;
   a memory module slot, accommodating a memory;
   a voltage control circuit, coupled to the memory module slot to provide a configured operation voltage to the memory module slot; and
   a recognition apparatus, coupled to the system power state signal, the control signal and the voltage control circuit, the recognition apparatus comprising at least one logic gate coupled to at least one flip-flop unit; wherein
   the voltage control circuit firstly outputs a preset voltage to the memory and then the hardware device outputs the control signal after performing an operation to determine the type of the memory; and
   the recognition apparatus outputs a voltage adjustment signal after receiving the control signal and the system power state signal, so that the voltage control circuit outputs the configured operation voltage to the memory, wherein the system power state signal enters a low logic state when the computer system enters a STD mode, a soft off mode or a mechanical power off mode, and the recognition apparatus receives the system power state signal and then drives the voltage control circuit to output the preset voltage to the memory.

7. The motherboard according to claim 6, wherein the hardware device comprises a central process unit executing a software program to generate the control signal.

8. The motherboard according to claim 6, wherein the voltage adjustment signal is configured as a high logic state when the system power state signal is a low logic state; the voltage adjustment signal is configured as a low logic state when the control signal to be converted from the low logic state to the high logic state and the system power state signal is the high logic state; and the voltage adjustment signal otherwise remains a previous logic state.

9. The motherboard according to claim 8, wherein the recognition apparatus further comprises:
   an inverter, having an input terminal and an output terminal, wherein the input terminal is coupled to the control signal; and
   a D-flip-flop, comprising a data terminal, a clock terminal, a clear terminal, an inverted output terminal and a preset terminal, wherein the data terminal is coupled to the output terminal of the inverter, the clock terminal is coupled to the control signal, the clear terminal is coupled to the system power state signal, the inverted output terminal is coupled to the voltage adjustment signal, and the preset terminal is coupled to a specific voltage; wherein
   when the clear terminal is the low logic state, the inverted output terminal is configured to the high logic state, when the clear terminal is the high logic state and the clock terminal is converted from the low logic elate to the high logic state the inverted output terminal is configured to the low logic state, and the inverted output terminal is otherwise maintained at the previous logic state.

10. The motherboard according to claim 9, wherein the D-flip-flop comprises an RS D-flip-flop.

* * * * *